United States Patent [19]

Porter et al.

[11] Patent Number: 5,150,685

[45] Date of Patent: Sep. 29, 1992

[54] APPARATUS AND METHOD FOR CONVERTING CONVENTIONALLY FUELED ENGINES TO OPERATE ON AN ALTERNATIVE FUEL

[76] Inventors: Fred C. Porter, 31065 Stafford Dr., Birmingham, Mich. 48010; Garth J. Schultz, 2111 Lovington Ave., Apt. #106, Troy, Mich. 48083

[21] Appl. No.: 758,894

[22] Filed: Sep. 11, 1991

[51] Int. Cl.$^5$ ................ F02D 41/04; F02M 21/02
[52] U.S. Cl. .................................. 123/478; 123/527
[58] Field of Search ........... 123/478, 480, 494, 381, 123/525, 527, 472, 575

[56] References Cited

U.S. PATENT DOCUMENTS

| | | | |
|---|---|---|---|
| 4,112,875 | 9/1978 | Laumann et al. | 123/1 A |
| 4,181,100 | 1/1980 | Yamane et al. | 123/431 |
| 4,495,930 | 1/1985 | Nakajima | 123/575 |
| 4,531,497 | 7/1985 | Smith | 123/525 |
| 4,537,172 | 8/1985 | Kanehara et al. | 123/478 X |
| 4,553,504 | 11/1985 | Duggal et al. | 123/25 J |
| 4,617,904 | 10/1986 | Pagdin | 123/527 X |
| 4,632,083 | 12/1986 | Reggiani | 123/527 |
| 4,635,608 | 1/1987 | Carroll | 123/557 |
| 4,711,223 | 12/1987 | Carroll | 123/557 |
| 4,865,001 | 9/1989 | Jensen | 123/525 |
| 4,876,988 | 10/1989 | Paul et al. | 123/1 A |
| 4,889,097 | 12/1989 | Bevill et al. | 123/478 |
| 4,922,862 | 5/1990 | Casacci | 123/1 A |
| 4,955,345 | 9/1990 | Brown et al. | 123/478 X |
| 4,989,570 | 2/1991 | Kuribara et al. | 123/494 |
| 4,995,367 | 2/1991 | Yamauchi et al. | 123/494 |
| 5,003,956 | 4/1991 | Iwamoto et al. | 123/494 |

*Primary Examiner*—Willis R. Wolfe
*Attorney, Agent, or Firm*—Brooks & Kushman

[57] ABSTRACT

An apparatus and method for converting a fuel injected internal combustion engine normally operated with a conventional fuel such as gasoline to operate with an alternative fuel are disclosed. The apparatus comprises an alternative fuel introduction assembly having at least one alternative fuel injector, a temperature sensor, and an electronic translator. The electronic translator is adapted to receive conventional fuel injector control signals generated by an electronic control module, and to receive an output signal from the temperature sensor. The electronic translator then calculates an alternative fuel injector control signal to facilitate the supply of a required energy amount of the alternative fuel. The calculation is based upon the energy content of the alternative fuel, the temperature of the alternative fuel, and the flow and operating characteristics of the alternative fuel injector relative to a conventional fuel injector. Preferably, the alternative fuel is natural gas.

13 Claims, 3 Drawing Sheets

APPARATUS AND METHOD FOR CONVERTING CONVENTIONALLY FUELED ENGINES TO OPERATE ON AN ALTERNATIVE FUEL

TECHNICAL FIELD

This invention relates to internal combustion engines which run on alternative fuels, and more particularly to an apparatus and method for converting conventional gasoline engines to operate with a gaseous alternative fuel.

BACKGROUND ART

Atmospheric pollution generated by exhaust emissions from conventional gasoline or diesel powered internal combustion engines is a well documented problem. One recognized method of reducing noxious emissions is to replace the conventional fuel with a cleaner burning alternative fuel. For example, U.S. Pat. Nos. 4,711,223 and 4,635,608 issued to Carroll teach an alcohol fueled engine. Similarly, U.S. Pat. No. 4,112,875 issued to Laumann et al. discloses a hydrogen-oxygen fueled engine.

A problem with such alternative fuels is that they generally have less energy per unit volume than gasoline or diesel fuel, and therefore the power available from alternatively fueled engines is often reduced. To minimize the effects of this problem, designers have proposed to run such engines on a mixture of the alternative fuel with gasoline. See, for example, U.S. Pat. No. 4,995,367 issued to Yamauchi et al. Yamauchi teaches a system for controlling both fuel injection and ignition timing in an internal combustion engine operating on a fuel mixture such as gasoline and methanol. Similarly, U.S. Pat. No. 4,876,988 issued to Paul et al. teaches a combined fuel engine in which an auxiliary fuel such as methanol, ethanol or liquified natural gas high in hydrogen may be injected in various proportions with a conventional fuel. See also, U.S. Pat. No. 4,865,001 issued to Jensen which teaches the use of natural gas to supplement conventional diesel fuel. As disclosed by Jensen, a gaseous fuel injector valve is regulated according to certain sensed engine operating parameters, including the gaseous fuel temperature.

A problem with these supplementary systems is that they generally require a separate fuel transportation system for the alternative fuel. These transportation systems are often duplicative of those already in place for the transport of gasoline or diesel fuel, and thus increase the weight and cost of the vehicle due to the use of redundant parts. See, for example, U.S. Pat. No. 4,495,930 to Nakajima which discloses an internal combustion engine which utilizes separate gasoline and alcohol fuel injectors, as well as separate fuel transportation systems. As disclosed by Nakajima, the sets of injectors are separately controlled by a control system which outputs separate pulse width injection command signals.

One way of reducing the number of redundant parts when using an alternative fuel has been proposed by U.S. Pat. No. 4,922,862 to Cassacci. Cassacci discloses a system for supplying different fuels such as liquid petroleum gas or compressed natural gas to Otto engines with electronic fuel injection. As disclosed by Cassacci, the original injection nozzle and electronic control box are used, and a signal multiplier is added between the injection nozzle and the control box. The signal multiplier modifies the parameters leaving the control box in accordance with a constant correction value to control the quantity of gas injected and to advance the spark plug ignition.

SUMMARY OF THE INVENTION

The present invention provides a novel apparatus and method for converting conventionally fueled engines to operate on an alternative fuel. As disclosed and claimed herein, the apparatus comprises an alternative fuel introduction assembly, a temperature sensor, and an electronic translator. The alternative fuel introduction assembly includes a housing having an interior chamber, an inlet passage in fluid communication with a source of the alternative fuel, and an alternative fuel injector for putting the interior chamber in fluid communication with the engine. The temperature sensor is adapted to measure the temperature of the alternative fuel and generate an output signal indicative of the temperature. The electronic translator accepts conventional fuel injector control signals produced by an electronic control module and also accepts the output signal from the temperature sensor.

In accordance with the present invention, the electronic translator converts the conventional fuel injector control signals to an intermediate alternative fuel injector control signal, based upon the temperature of the alternative fuel and an application of the energy content differential between the conventional and alternative fuels. The electronic translator then generates a final alternative fuel injector control signal based on the flow and operating characteristics of the alternative fuel injector. The final alternative fuel injector control signal is then communicated to the alternative fuel introduction assembly to control the period of time the alternative fuel injector puts the interior chamber in fluid communication with the engine.

Accordingly, it is an object of the present invention to provide an apparatus of the type described above which reduces noxious emissions generated by a conventionally fueled internal combustion engine.

Another object of the present invention is to provide an apparatus of the type described above which reduces the number of components necessary to convert a conventionally fueled engine to operate with an alternative fuel.

Still another object of the present invention is to provide an apparatus and method of the type described above which converts conventional fuel injector control signals to an alternative fuel injector control signal as a function of the energy content differential between the conventional fuel and a gaseous alternative fuel, as a function of the differences in operating and flow characteristics of an alternative fuel injector relative to a conventional fuel injector, and also as a function of the temperature of the alternative fuel.

These and other objects, features and advantages of the present invention will be more apparent from the following description and drawings.

BEST MODE FOR CARRYING OUT THE INVENTION

With reference to the drawings, the preferred embodiment of the present invention will be described.

Figure 1:
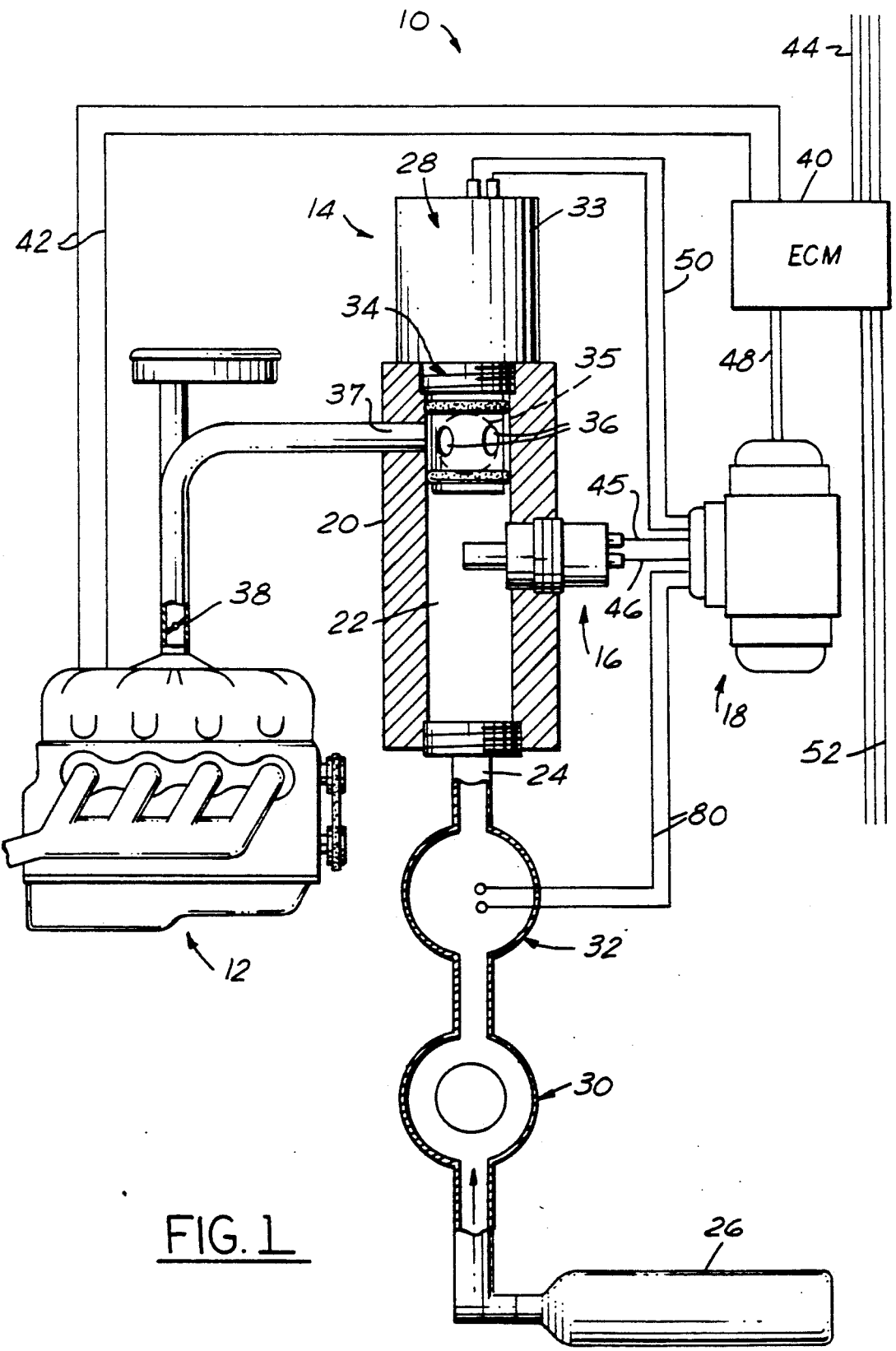
FIG. 1 is a schematic diagram of an apparatus for converting a conventionally fueled internal combustion engine to operate with an alternative fuel, according to the present invention.

FIG. 1 shows an apparatus generally designated by reference numeral 10 for converting a throttle body fuel injected internal combustion engine 12 normally operated with a conventional fuel such as gasoline to operate with an alternative fuel. The apparatus 10 comprises an alternative fuel introduction assembly 14, a temperature sensor 16, and an electronic translator 18. The alternative fuel introduction assembly 14 includes a housing 20 having an interior chamber 22, an inlet passage 24 in fluid communication with a source 26 of the alternative fuel, and an alternative fuel injector 28, or multiple assemblies 14 can be used. For purposes of illustration, a single alternative fuel introduction assembly 14 utilizing a single alternative fuel injector 28 is shown. However, it should be understood that the alternative fuel introduction assembly 14 may have a plurality of injectors 28, or multiple assemblies 14 may be used. In the preferred embodiment, two alternative fuel injectors 28 are used in a single assembly 14.

The alternative fuel is kept as a compressed gas or liquid in the alternative fuel tank 26, and when released by a pressure regulator 30 flows past a shutoff valve 32, through the inlet passage 24, and into the interior chamber 22. The alternative fuel may be any one which assumes a gaseous phase when introduced into the interior chamber 22 at normal operating temperatures and pressures. Typically, operating temperatures in the interior chamber 22 range between −40 and 220 degrees Fahrenheit, with pressures up to 200 pounds per square inch (psi). Natural gas is the preferred alternative fuel for use with the present invention. However, pure methane is also suitable and may be used as an alternative fuel in accordance with the present invention.

Still referring to FIG. 1, alternative fuel injector 28 preferably comprises a solenoid portion 33 and a valve container portion 34 threadingly engaged with the housing 20 and extending partially into the interior chamber 22. The alternative fuel injector 28 is moveable between an open position and a closed position. In the open position, a conventional ball or valve 35 within the valve container portion 34 moves when the solenoid portion 33 is energized to allow gaseous alternative fuel to flow through orifices 36 located in the outside of the valve container portion 34. With the orifices 36 so exposed, the interior chamber 22 is in fluid communication with the engine 12 through the orifices 36, an outlet nozzle 37, and a throttle 38. Although FIG. 1 shows the alternative fuel being introduced upstream from the throttle 38, it should be appreciated that the alternative fuel may instead be introduced downstream of the throttle 38. In the closed position shown in FIG. 1, the solenoid portion 33 is not energized, and the valve 35 reseats so that the interior chamber 22 is sealed from fluid communication with the engine 12. A suitable alternative fuel injector for this purpose is an HSV 3000, manufactured by Servojet Products International of San Diego, Calif.

Preferably, the pressure of the alternative fuel in the interior chamber 22 is maintained at approximately 175 psi, but should be at least sufficient to establish sonic flow characteristics through the alternative fuel injector 28. In the preferred embodiment shown in FIG. 1, it is thus necessary that the ratio of the pressure in the interior chamber 22 divided by the pressure at the outlet nozzle 37 (which is normally at or near atmospheric pressure) be maintained above the critical pressure ratio. For the preferred embodiment, therefore, the pressure in the interior chamber 22 should be at least 50 psi.

An engine electronic control module (ECM) 40 is typically utilized in conventionally powered fuel injected motor vehicles to control the vehicle's conventional fuel injectors (not shown). This is accomplished by generating electronic pulses of a certain voltage, the duration of which controls the time the conventional injectors will be conditioned to supply fuel to the engine. The duration of the electronic pulses is known as the pulse width, and is calculated by an algorithm hard wired in the electronic control module 40. The algorithm calculates a base pulse width term which may be designated $t_1$ from a set of variables corresponding to sensor readings such as the oxygen content of the engine exhaust gases, engine revolutions per minute, coolant temperature, intake manifold air temperature, manifold pressure, vehicle speed, throttle position, and engine knock. This information is typically supplied to the electronic control module 40 via lines 42 and 44.

Electronic control module 40 also contains a calibration programmable read only memory (PROM). The PROM contains values in look up tables which are normally utilized by conventional fuel injection systems when particular engine operating contingencies occur. For example, gasoline is known to periodically saturate the intake manifold of conventional engines. In anticipation of this condition, the standard PROM may be programmed to react by interrupting the supply of gasoline to the conventional injectors. It should be noted, however, that a gaseous alternative fuel as used in the present invention will not saturate the intake manifold. Therefore, this type of fuel interruption contingency is unnecessary in the present invention and is referenced only for illustrative purposes. In the present invention, the PROM is recalibrated for optimal operation with the alternative fuel.

Still referring to FIG. 1, the temperature sensor 16 is adapted to measure the temperature of the alternative fuel. A reference signal having a voltage of five volts, for example, is provided by the electronic translator 18 on line 45. A return signal is also provided on line 46. This signal, in accordance with the present invention, is interpreted by the electronic translator 18 to identify the temperature of the alternative fuel.

It is known that the energy content of a given gaseous fuel is directly proportional to its mass. Thus, when provided a constant volume such as in interior chamber 22, the energy content which is available to the engine from a gaseous fuel is directly proportional to the pressure of the gaseous fuel and inversely proportional to its temperature. Therefore, assuming a constant pressure through the regulator 30, the most accurate estimate of the energy deliverable to the engine 12 per alternative fuel injector cycle is obtained by measuring the temperature of the alternative gaseous fuel near its point of injection. Accordingly, the temperature sensor 16 is placed in the interior chamber 22 or proximate thereto. It should be understood, however, that the temperature reading may also be taken at other appropriate locations.

The electronic translator 18 of the present invention is adapted to receive conventional fuel injector control signals which are output by the electronic control module 40 via lines 48, and the output signal from the temperature sensor 16 output via line 46. As seen in FIG. 1, lines 48 are in electrical contact with electronic control module 40 and electronic translator 18. The electronic translator 18 then generates an intermediate alternative fuel injector control signal $t_2$ indicative of the energy demanded by the engine 12, based upon the energy content of the alternative fuel in the known volume of the interior chamber 22, at the known pressure and sensed temperature.

GENERATION OF THE INTERMEDIATE ALTERNATIVE FUEL INJECTOR CONTROL SIGNAL

Figure 2:
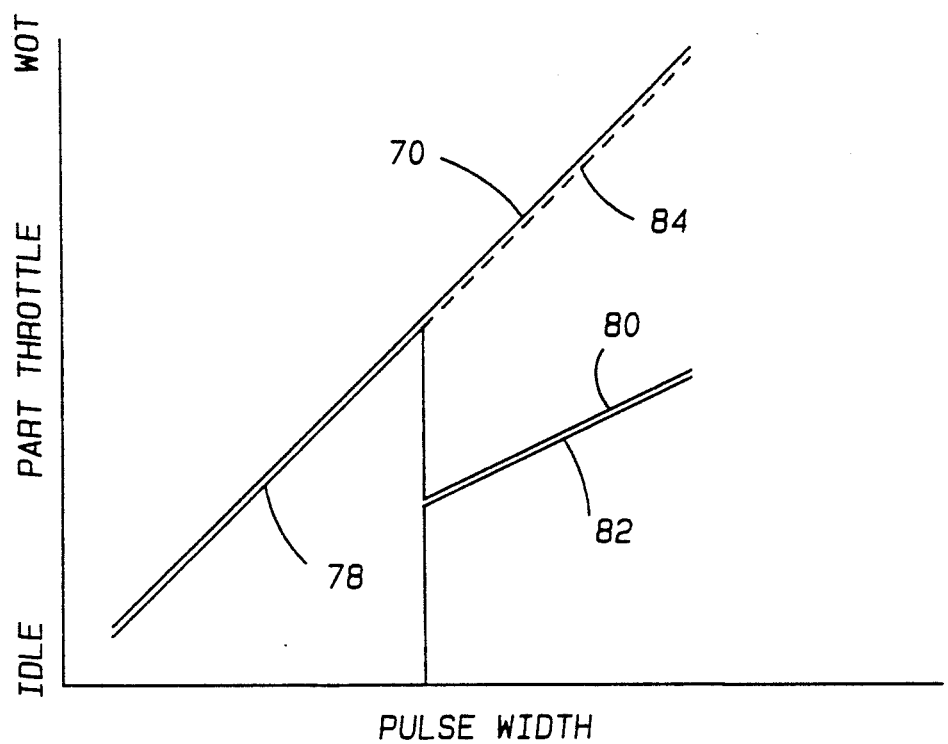
FIG. 2 is a comparative graph of the pulse width of an injector control signal versus energy delivered to the engine by (1) a conventional fuel injector, and (2) an alternative fuel introduction assembly of the present invention.

As shown by the curve 70 in FIG. 2, the energy ($\dot{E}$) deliverable to the engine by a conventional liquid fuel injector per injection is a generally linear function between engine idle and wide open throttle of the time $t_1$ the valve of the conventional fuel injector remains open:

$$\dot{E} = M_1 t_1 + B_1$$

The slope $M_1$ of the curve 70 depends on actual flow and operating characteristics such as the orifice size of the conventional fuel injector. The intercept $B_1$ corresponds to the energy delivered when the conventional fuel injector valve is open for zero time, and may be assumed to approach zero. Because the valve normally does not respond below a minimum pulse width of about 1.5 milliseconds, this is a reasonable model.

The energy deliverable by a gaseous alternative fuel, which is directly proportional to its mass flow rate $\dot{m}$, may be written $$\dot{E} = M_2 t_2 + B_2$$

Because an alternative fuel system must approximate the conventional fuel energy delivery schedule, the above equations may be equated to solve for $t_2$, the theoretical time an alternative fuel injector with equivalent operating and flow characteristics as the conventional injector must remain open to deliver the same amount of energy:

$$t_2 = \frac{M_1 t_1 + B_1 - B_2}{M_2}$$

Because it is further recognized that $B_1$ and $B_2$ must go to zero, $t_2$ may be written as $$t_2 = \frac{M_1}{M_2} t_1$$

It is also recognized that $M_1/M_2$ is theoretically a constant which may be designated $C_1$. In practice, this constant term may have to be calibrated for differences in stoichiometric ratios.

For a sonic nozzle, the following formulae are applicable:

$$\dot{m} = \frac{P_2 * C_d * A * \sqrt{k*g*R*T_2} * 453.6}{R*T_2} \quad (1)$$

$$\dot{m} = q_{gas}/t_2 \quad (2)$$

$$P_{RC} = (2/R + 1)^{(\frac{k}{k-1})} \quad (3)$$

$$P_2 = P_1 * P_{RC} \quad (4)$$

$$T_2 = T_1/(1 + (k-1)/2) \quad (5)$$

Where:
 $q_{gas}$ = mass injection rate of gaseous alternative fuel (mg/injection)
 m = mass flow rate of gaseous alternative fuel
 (Known) $T_1$ = inlet temperature
 $T_2$ = outlet temperature
 (Known) $P_1$ = inlet pressure
 $P_2$ = outlet pressure
 $P_{RC}$ = critical pressure ratio
 (Known) g = gravity
 (Known) k = gas constant
 $t_2$ = intermediate injection duration term for alternative fuel injector
 (Known) A = discharge area
 (Known) $C_d$ = discharge coefficient
 (Known) R = specific heat ratio of gaseous alternative fuel Substituting equation 1 into equation 2 for m and solving for $t_2$, gives $$t_2 = \frac{q_{gas} * R * T_2}{P_2 * C_d * A * \sqrt{k*g*R*T_2} * 453.6}$$

Further substitution of equations 4 and 5 for $P_2$ and $T_2$ gives $$t_2 = \frac{q_{gas} * R * \frac{T_1}{(1 + (k-1)/2)}}{P_1 * P_{RC} * C_d * A * \sqrt{k*g*R*\frac{T_1}{(1 + (k-1)/2)}} * 453.6}$$

Substituting for $P_{RC}$ with equation 3 and reducing gives $$t_2 = \frac{q_{gas} * C_3 * T_1}{\sqrt{\frac{T_1}{C_2}}}$$

Where $C_2$ is a constant equal to $$\frac{1}{\left( (453.6) P_1 \left( \frac{2}{R+1} \right)^{(\frac{k}{k-1})} C_d A \sqrt{\frac{kgR}{(1+(k-1)/2)}} \right)^2}$$

and $C_3$ is a constant equal to $R/(1+(k-1)/2)$. If $q_{gas}$ is expressed in terms of energy delivered, $$t_2 = \frac{E \cdot C_3 \cdot T_1}{\sqrt{\frac{T_1}{C_2}}}$$

Substituting $$E = M_2(t_1 \cdot C_1) + B_2$$

and a new constant $C_4$ equal to $M_1$ times $C_3$ gives an intermediate pulse term of the alternative fuel injector 14:

$$t_2 = \frac{t_1 \cdot C_4 \cdot T_1}{\sqrt{\frac{T_1}{C_2}}}$$

Experimentation has established working values in the preferred embodiment for $C_4$ and $C_2$ as 0.0041523 and 1.16, respectively.

The intermediate base pulse width signal $t_2$ is thus calculated as a function of the fuel energy content differential between the conventional fuel and the alternative fuel, and the temperature of the alternative fuel $T_1$ as measured by the temperature sensor 16.

GENERATION OF THE FINAL ALTERNATIVE FUEL INJECTOR CONTROL SIGNAL

The intermediate signal $t_2$ is further adjusted by the electronic translator 18 because the characteristics of the alternative fuel injection system normally differ from those of the conventional fuel injection system. The adjustment of the intermediate alternative injector signal $t_2$ to a final alternative fuel injector control signal $t_3$ is based on the number of alternative fuel injectors used, their operating characteristics, and their flow characteristics.

Figure 3:
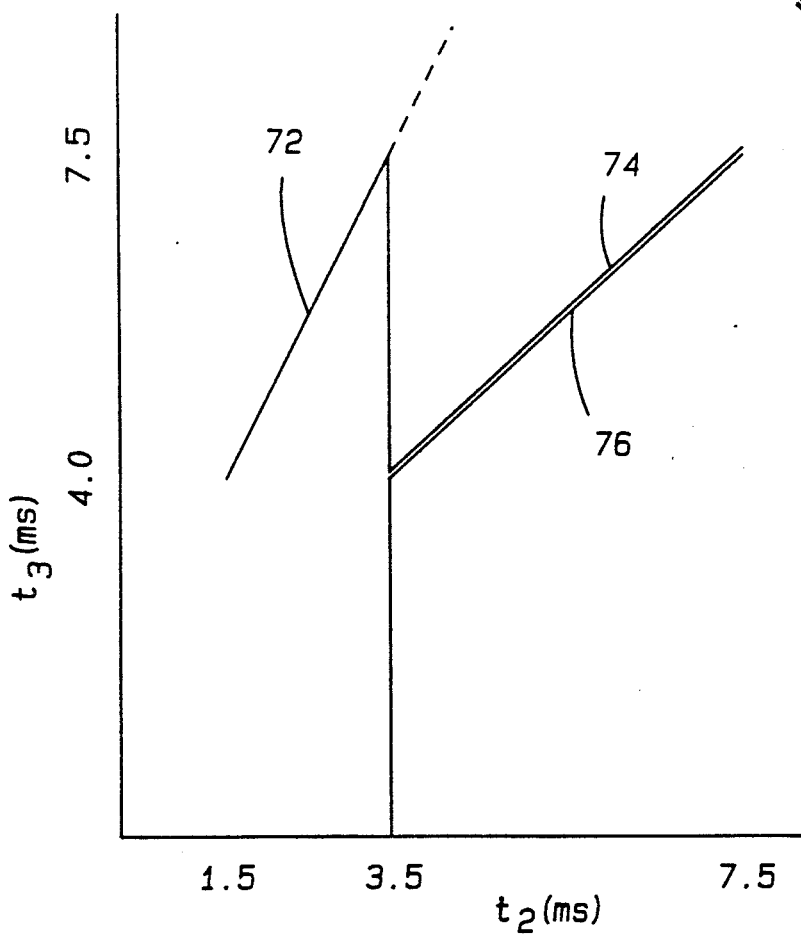
FIG. 3 is a graph of an intermediate alternative fuel injector control signal as generated by an electronic translator of the present invention versus the final alternative fuel injector control signal generated by the electronic translator.

A single primary alternative fuel injector delivers a predictable flow throughout its linear operating range, which in the preferred embodiment is 4 to 26 milliseconds. For a throttle body fuel injection system producing maximum horsepower at 4000 rpm, the maximum feasible pulse width is about 7.5 milliseconds. Thus, the final signal $t_3$ cannot exceed this upper limit. As shown in FIG. 3, therefore, the intermediate signal $t_2$ preferably between about 1.5 and 3.5 milliseconds is translated to the final signal $t_3$ having a pulse width of about 4.0 to 7.5 milliseconds. The slope of the curve 72 is also a function of the mass flow rate through the alternative fuel injector. The mass flow rate is determined by flow and operating characteristics of the system, such as the pressure of the flow through the alternative fuel injectors, the size of the ball seat or orifice, and the stroke of the alternative fuel injector valve. In the preferred embodiment, the ball seat or orifice size is about 0.094 inch, and the stroke is about 0.023 inch.

The energy deliverable by a single primary alternative fuel injector may only partially satisfy the energy requirements of the engine, however. As load on the engine increases past the capacity of the single alternative fuel injector, a second alternative fuel injector is activated at a value of $t_2$ which will allow both primary and secondary alternative fuel injectors to operate within their effective linear pulse width range. The combined on time of the primary and secondary alternative fuel injectors as shown by the lines 74 and 76, respectively, is tailored to supply the appropriate total energy requirements of the engine without exceeding the maximum allowable value of $t_3$.

Referring again to FIG. 2, line 78 shows that the single alternative fuel injector is sufficient to approximate the energy delivery curve of the conventional fuel injector system curve 70 up to a part throttle point where the alternative fuel injector 28 operates at its maximum allowable pulse width. Thereafter, the energy delivered by the primary and secondary alternative fuel injectors, as shown by the lines 80 and 82, combines to approximate the conventional fuel injection system all the way through wide open throttle (WOT), as shown by broken line 84. Additional alternative fuel injectors may be added to supply greater energy requirements, and similarly phased in, if energy demand increases.

Referring again to FIG. 1, the final alternative fuel injector control signal $t_3$ is generated by the electronic translator 18 through electronic pulse-width modulation, and output to the alternative fuel injector 28 via electrical lines 50 to control the period of time the alternative fuel injector 28 remains in the open position. This process meters the flow of the alternative fuel to the engine 12, and is continuously adjustable as engine operating conditions vary. The remaining signals normally output by the electronic control module 40 to other engine controls via lines 52 bypass the translator 18 entirely, but alternatively could be wired into the translator to pass through undisturbed.

The regulator 30 controls the pressure at which the alternative fuel is introduced into the interior chamber 22 from the storage cylinder 26. Normally, this pressure is predetermined and preset by mechanically adjusting a conventional flow valve. As an alternative to pulse width modulation of the alternative fuel injector 28, the energy delivered to the engine 12 can be controlled by active pressure control. Thus, the conventional fuel injector control signals from the electronic control module 40 can be fed directly to the alternative fuel introduction assemblies 14, and energy delivery to the engine controlled by varying the pressure of the alternative fuel as it flows through the regulator 30. A feedback control system changes the flow characteristics to give the desired energy delivery curve, i.e. low pressure for idle and higher pressure for wide open throttle.

The shutoff valve 32 is preferably solenoid operated, energized and deenergized between an open and a closed position, respectively, by the electronic translator 18 via electrical lines 80. The shutoff valve 32 is located downstream from the alternative fuel source 26 and upstream of the inlet passage 24. When injector pulses from the electronic control module 40 are sensed by the electronic translator 18, the shutoff valve 32 is energized and moves to the open position wherein the alternative fuel may be introduced into the interior chamber 22. When no injector pulses are sensed by the electronic translator 18, the shutoff valve 32 assumes the closed position wherein the alternative fuel may not be introduced into the interior chamber 22.

Figure 4:
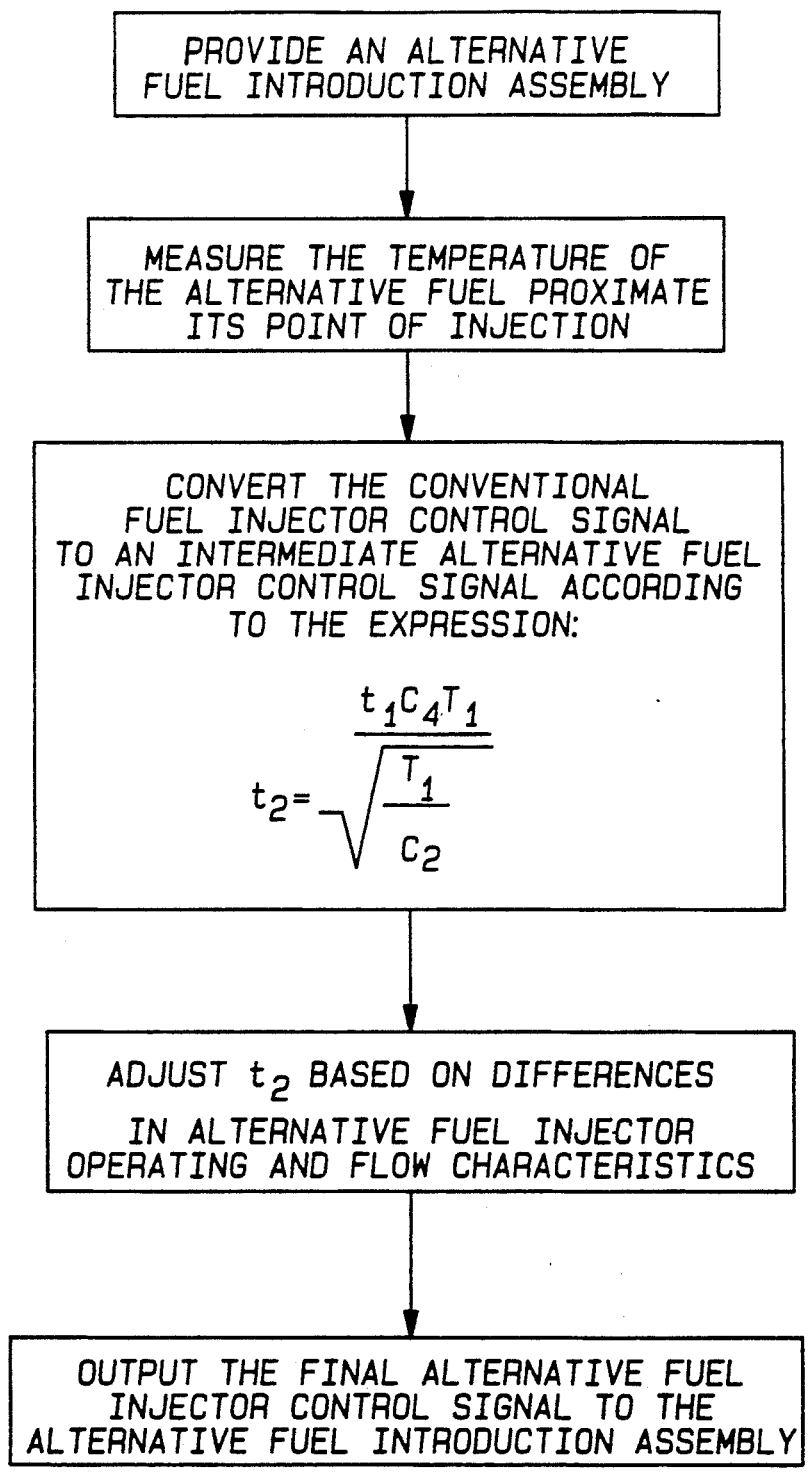
FIG. 4 is a flow chart of the method steps of the present invention required to convert a conventionally fueled internal combustion engine to operate with an alternative fuel.

Referring now to FIG. 4, there is shown a method for converting a conventionally fueled internal combustion engine to operate on an alternative fuel. The method is adapted for use with an electronic control module which generates control signals to conventional fuel injectors. The method comprises providing an alternative fuel introduction assembly having an alternative fuel injector, the alternative fuel injector being movable between an open position adapted to supply the alternative fuel to the engine, and a closed position. A source of the alternative fuel is provided to the alternative fuel introduction assembly, and the temperature of the alternative fuel is measured proximate or in the alternative fuel introduction assembly. The conventional fuel injector control signals are then converted to an intermediate alternative fuel injector control signal in response to the temperature of the alternative fuel and in response to the energy content differential between the alternative fuel and the conventional fuel. Preferably, the conversion is accomplished according to the expression:

$$t_2 = \frac{t_1 * C_4 * T_1}{\sqrt{\frac{T_1}{C_2}}}$$

The intermediate alternative fuel injector signal $t_2$ is then converted to a final alternative fuel injector control signal $t_3$ by the electronic translator to compensate for the number of injectors used and their flow and operating characteristics. Finally, the alternative fuel injector control signal $t_3$ is output to the alternative fuel introduction assembly to control the movement of the alternative fuel injector to the open position, and thereby meter the flow of the alternative fuel to the engine. In this way, the energy requirements of the engine are met throughout its operating range.

It should be understood, of course, that while the forms of the invention herein shown and described constitute preferred embodiments of the invention, they are not intended to illustrate all possible forms thereof. It should also be understood that the words used are words of description rather than limitation and various changes may be made without departing from the spirit and scope of the invention disclosed.

What is claimed is:

1. Apparatus for converting a conventionally fueled internal combustion engine to operate with an alternative fuel, the engine having an electronic control module which generates a control signal for output to a conventional fuel injector, the apparatus comprising:

an alternative fuel introduction assembly including a housing having an interior chamber, an inlet passage in fluid communication with a source of alternative fuel, and an alternative fuel injector moveable between an open position adapted to place the interior chamber in fluid communication with the engine and a closed position adapted to seal the interior chamber from fluid communication with the engine;

a temperature sensor adapted to measure the temperature of the alternative fuel and to generate an output signal indicative of the measured temperature; and an electronic translator in electrical contact with the alternative fuel introduction assembly, the temperature sensor, and the electronic control module, the electronic translator adapted to receive the control signal and the output signal, and to generate an alternative fuel injector control signal in accordance with the energy content differential of conventional fuel and the alternative fuel, and also in accordance with the flow characteristics and operating characteristics of the alternative fuel injector, for output to the alternative fuel introduction assembly, the alternative fuel injector control signal controlling the period of time the alternative fuel injector remains in the open position so as to meter the flow of the alternative fuel to the engine.

2. The apparatus of claim 1 further comprising a regulator in fluid communication with the source of alternative fuel and with the alternative fuel introduction assembly for controlling the pressure at which the alternative fuel is introduced into the interior chamber.

3. The apparatus of claim 1 further comprising a shutoff valve in fluid communication with the source of alternative fuel and with the alternative fuel introduction assembly, the shutoff valve being moveable between an open position wherein the alternative fuel may be introduced into the interior chamber and a closed position wherein the alternative fuel may not be introduced into the interior chamber.

4. The apparatus of claim 1 wherein the alternative fuel injector control signal is a base pulse width signal ($t_3$).

5. The apparatus of claim 1 wherein the conventional fuel injector control signal is a pulse width signal ($t_1$), and an intermediate alternative fuel injector base pulse width signal ($t_2$) is generated as a function of constants $C_4$ and $C_2$, according to the expression $$t_2 = \frac{(t_1)(C_4)(T_1)}{\sqrt{\left(\frac{T_1}{C_2}\right)}}$$

6. The apparatus of claim 1 wherein the temperature sensor is adapted to measure the temperature of the alternative fuel in the interior chamber of the alternative fuel introduction assembly.

7. The apparatus of claim 1 wherein the alternative fuel introduction assembly is adapted to receive alternative fuel in a gaseous state in the interior chamber.

8. The apparatus of claim 1 wherein the alternative fuel introduction assembly is adapted to receive alternative fuel in a gaseous state at pressures sufficient to establish sonic flow through the alternative fuel injector.

9. The apparatus of claim 1 wherein the alternative fuel introduction assembly is adapted to receive natural gas.

10. Apparatus for converting a conventionally fueled internal combustion engine to operate with an alternative fuel, the engine having an electronic control module which generates a control signal ($t_1$) for output to a conventional fuel injector, the apparatus comprising:

an alternative fuel introduction assembly including a housing having an interior chamber, an inlet passage in fluid communication with a source of alternative fuel, and an alternative fuel injector moveable between an open position adapted to place the interior chamber in fluid communication with the engine and a closed position adapted to seal the interior chamber from fluid communication with the engine;

a temperature sensor adapted to measure the temperature of the alternative fuel and to generate an output signal ($T_1$) indicative of the measured temperature; and an electronic translator in electrical contact with the alternative fuel introduction assembly, the temperature sensor, and the electronic control module, the electronic translator adapted to receive the control signal and the output signal, and to generate an intermediate alternative fuel injector base pulse width control signal ($t_2$) in accordance with the energy content differential of conventional fuel and the alternative fuel according to the expression $$t_2 = \frac{(t_1)(C_4)(T_1)}{\sqrt{\left(\frac{T_1}{C_2}\right)}}$$

and the electronic translator further adapted to adjust the intermediate control signal ($t_2$) to a final alternative fuel injector control signal ($t_3$) in accordance with the flow and operating characteristics of the alternative fuel injector, and to output the final alternative fuel injector control signal ($t_3$) to the alternative fuel introduction assembly, the final alternative fuel injector control signal ($t_3$) controlling the period of time the alternative fuel injector remains in the open position so as to meter the flow of the alternative fuel to the engine.

11. A method of converting a conventionally fueled internal combustion engine to operate with an alternative fuel, the engine having an electronic control module which generates a control signal to a conventional fuel injector, the method comprising:

providing an alternative fuel introduction assembly having an alternative fuel injector, the alternative fuel injector movable between an open position adapted to supply the alternative fuel to the engine and a closed position adapted to seal the alternative fuel from the engine;

providing a source of alternative fuel in fluid communication with the alternative fuel introduction assembly;

measuring the temperature of the alternative fuel and generating an output signal indicative of the measured temperature;

generating an intermediate alternative fuel injector control signal in response to the temperature of the alternative fuel ($T_1$) and the energy content differential of conventional fuel and the alternative fuel;

adjusting the intermediate alternative fuel injector control signal to a final alternative fuel injector control signal in accordance with the flow and operating characteristics of the alternative fuel injector; and transmitting the final alternative fuel injector control signal to the alternative fuel introduction assembly to control the movement of the alternative fuel injector.

12. The method of claim 11 wherein the conventional fuel injector control signal is a pulse width signal ($t_1$), and the intermediate alternative fuel injector control signal ($t_2$) is further generated as a function of constants $C_4$ and $C_2$, according to the expression $$t_2 = \frac{(t_1)(C_4)(T_1)}{\sqrt{\left(\frac{T_1}{C_2}\right)}}$$

13. The method of claim 11 wherein the temperature of the alternative fuel is measured proximate the alternative fuel introduction assembly.

* * * * *